United States Patent
Carnevali et al.

(10) Patent No.: US 10,812,643 B1
(45) Date of Patent: Oct. 20, 2020

(54) CASES FOR MOBILE DEVICES INCORPORATING A LIGHT WITHIN THE CASE AND METHODS OF MAKING AND USING

(71) Applicant: National Products, Inc., Seattle, WA (US)

(72) Inventors: Jeffrey D. Carnevali, Seattle, WA (US); Scott Anderson, Seattle, WA (US)

(73) Assignee: NATIONAL PRODUCTS, INC., Seattle, WA (US)

( * ) Notice: Subject to any disclaimer, the term of this patent is extended or adjusted under 35 U.S.C. 154(b) by 0 days.

(21) Appl. No.: 16/866,156

(22) Filed: May 4, 2020

(51) Int. Cl.
| | |
|---|---|
| *H04M 1/21* | (2006.01) |
| *F21V 23/04* | (2006.01) |
| *H04B 1/3888* | (2015.01) |
| *H04M 1/04* | (2006.01) |
| *F21Y 115/10* | (2016.01) |

(52) U.S. Cl.
CPC ........... *H04M 1/21* (2013.01); *F21V 23/0485* (2013.01); *H04B 1/3888* (2013.01); *H04M 1/04* (2013.01); *F21Y 2115/10* (2016.08)

(58) Field of Classification Search
CPC combination set(s) only.
See application file for complete search history.

(56) References Cited

U.S. PATENT DOCUMENTS

| | | |
|---|---|---|
| 809,977 A | 1/1906 | O'Brien |
| 1,786,459 A | 7/1926 | Simons |
| 2,495,552 A | 1/1950 | Schmitz |
| (Continued) | | |

FOREIGN PATENT DOCUMENTS

| | | |
|---|---|---|
| CN | 101674096 | 3/2010 |
| CN | 202268924 | 6/2012 |
| (Continued) | | |

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(Continued)

*Primary Examiner* — Junpeng Chen
(74) *Attorney, Agent, or Firm* — Lowe Graham Jones PLLC; Bruce E. Black (57) ABSTRACT

A case for a mobile device includes a cover defining a cavity for receiving and holding the mobile device; an adapter disposed at least partially within the cover; and a light arrangement disposed within or adjacent to the cover. The adapter includes first contacts disposed on an exterior of the case, a male plug extending into the cavity for insertion into a female socket of the mobile device, and second contacts disposed on the male plug and electrically coupled to the first contacts. The light arrangement includes a light and a light actuator for manually turning the light on or off. The light is electrically coupled to at least one of the first contacts or the second contacts to obtain power from the mobile device received in the cover or from an external device electrically coupled to the first contacts.

20 Claims, 5 Drawing Sheets

(56) References Cited

U.S. PATENT DOCUMENTS

| | | | |
|---|---|---|---|
| 2,549,917 A | 4/1951 | Millbrandt |
| 2,565,939 A | 8/1951 | Wriston |
| 2,612,947 A | 10/1952 | Jenks |
| 2,717,093 A | 9/1955 | Mautner |
| 2,803,368 A | 8/1957 | Koch |
| 3,018,525 A | 1/1962 | Deisenroth |
| 3,140,883 A | 7/1964 | Anthony |
| 3,464,579 A | 9/1969 | Asenbauer |
| 3,667,648 A | 6/1972 | Koziol |
| 3,885,701 A | 5/1975 | Becklin |
| 3,972,459 A | 8/1976 | Cooper |
| 3,978,830 A | 9/1976 | Toth, Jr. |
| 4,298,204 A | 11/1981 | Jinkins |
| 4,564,880 A | 1/1986 | Christ et al. |
| 4,607,772 A | 7/1986 | Hancock |
| 4,828,558 A | 5/1989 | Kelman |
| 4,842,174 A | 6/1989 | Sheppard et al. |
| 4,848,319 A | 7/1989 | Appeldorn |
| 5,002,184 A | 3/1991 | Lloyd |
| 5,096,317 A | 3/1992 | Phillippe |
| 5,135,189 A | 8/1992 | Ghazizadeh |
| 5,246,133 A | 9/1993 | James |
| 5,272,771 A | 12/1993 | Ansell et al. |
| 5,295,602 A | 3/1994 | Swanson |
| 5,353,934 A | 10/1994 | Yamauchi |
| 5,535,274 A | 7/1996 | Braitberg et al. |
| 5,584,054 A | 12/1996 | Tyneski et al. |
| 5,586,002 A | 12/1996 | Notarianni |
| 5,641,065 A | 6/1997 | Owens et al. |
| 5,646,649 A | 7/1997 | Iwata et al. |
| 5,791,506 A | 8/1998 | Sheffler et al. |
| 5,813,096 A | 9/1998 | Soennichsen |
| 5,822,427 A | 10/1998 | Braitberg et al. |
| 5,842,670 A | 12/1998 | Nigoghosian |
| 5,845,885 A | 12/1998 | Carnevali |
| 5,860,550 A | 1/1999 | Miller et al. |
| 5,895,018 A | 4/1999 | Rielo |
| 5,953,795 A | 9/1999 | Bauer |
| 5,969,057 A | 10/1999 | Schoeley et al. |
| 5,990,874 A | 11/1999 | Tsumura et al. |
| 5,992,807 A | 11/1999 | Tarulli |
| 6,009,601 A | 1/2000 | Kaufman |
| 6,010,005 A | 1/2000 | Reames et al. |
| 6,032,910 A | 3/2000 | Richter |
| 6,034,505 A | 3/2000 | Arthur et al. |
| 6,035,800 A | 3/2000 | Clifford |
| 6,043,626 A | 3/2000 | Snyder et al. |
| 6,068,119 A | 5/2000 | Derr et al. |
| 6,149,116 A | 11/2000 | Won |
| 6,229,893 B1 | 5/2001 | Chen |
| 6,273,773 B1 | 8/2001 | Bourke |
| 6,276,552 B1 | 8/2001 | Vervisch |
| 6,295,198 B1 | 9/2001 | Loh et al. |
| 6,341,218 B1 | 1/2002 | Poplawsky et al. |
| 6,356,053 B1 | 3/2002 | Sandoz et al. |
| 6,377,825 B1 | 4/2002 | Kennedy et al. |
| 6,406,758 B1 | 6/2002 | Bottari et al. |
| 6,407,860 B1 | 6/2002 | Funazaki et al. |
| 6,572,176 B2 | 6/2003 | Davies et al. |
| 6,585,212 B2 | 7/2003 | Carnevali |
| 6,588,637 B2 | 7/2003 | Gates et al. |
| 6,597,924 B1 | 7/2003 | Smith |
| 6,614,423 B1 | 9/2003 | Wong et al. |
| 6,646,864 B2 | 11/2003 | Richardson |
| 6,648,376 B2 | 11/2003 | Christianson |
| 6,687,516 B2 | 2/2004 | Chen |
| 6,702,604 B1 | 3/2004 | Moscovitch |
| 6,754,343 B2 | 6/2004 | Lundstrom et al. |
| 6,762,585 B2 | 7/2004 | Liao |
| 6,776,422 B1 | 8/2004 | Toy |
| 6,785,566 B1 | 8/2004 | Irizarry |
| 6,785,567 B2 | 8/2004 | Kato |
| 6,816,713 B2 | 11/2004 | Chen |
| 6,842,171 B2 | 1/2005 | Richter et al. |
| 6,953,126 B2 | 10/2005 | Parker et al. |
| 6,984,680 B2 | 1/2006 | Quinn |
| 6,995,976 B2 | 2/2006 | Richardson |
| 7,017,243 B2 | 3/2006 | Carnevali |
| 7,031,148 B1 | 4/2006 | Lin |
| 7,068,783 B2 | 6/2006 | Peiker |
| 7,086,748 B1 * | 8/2006 | Elembaby ............ F21V 33/0052 362/109 |
| 7,158,376 B2 | 1/2007 | Richardson et al. |
| 7,180,735 B2 | 2/2007 | Thomas et al. |
| 7,230,823 B2 | 6/2007 | Richardson et al. |
| 7,248,901 B2 | 7/2007 | Peiker |
| 7,257,429 B2 | 8/2007 | Kogan |
| 7,283,849 B2 | 10/2007 | Peiker |
| 7,311,526 B2 | 12/2007 | Rohrbach et al. |
| 7,312,984 B2 | 12/2007 | Richardson et al. |
| 7,351,066 B2 | 4/2008 | DiFonzo et al. |
| 7,464,814 B2 | 12/2008 | Carnevali |
| 7,480,138 B2 | 1/2009 | Kogan et al. |
| 7,481,664 B1 | 1/2009 | Knoll et al. |
| 7,517,222 B2 | 4/2009 | Rohrbach et al. |
| 7,520,389 B2 | 4/2009 | Lalouette |
| 7,551,458 B2 | 6/2009 | Carnevali |
| 7,566,224 B2 | 7/2009 | Wu |
| 7,594,576 B2 | 9/2009 | Chen et al. |
| 7,609,512 B2 | 10/2009 | Richardson et al. |
| 7,612,997 B1 * | 11/2009 | Diebel ................ G06F 1/1632 361/679.41 |
| 7,641,477 B2 | 1/2010 | DiFonzo et al. |
| 7,645,143 B2 | 1/2010 | Rohrbach et al. |
| 7,663,879 B2 | 2/2010 | Richardson et al. |
| 7,688,580 B2 | 3/2010 | Richardson et al. |
| 7,812,567 B2 | 10/2010 | Shen |
| 7,841,776 B2 | 11/2010 | DiFonzo et al. |
| 7,850,032 B2 | 12/2010 | Carnevali et al. |
| 7,855,529 B2 | 12/2010 | Liu |
| 7,889,489 B2 | 2/2011 | Richardson et al. |
| 7,901,216 B2 | 3/2011 | Rohrbach et al. |
| 7,907,394 B2 | 3/2011 | Richardson et al. |
| 8,061,516 B2 | 11/2011 | Carnevali |
| 8,074,951 B2 | 12/2011 | Carnevali |
| 8,087,939 B2 | 1/2012 | Rohrbach et al. |
| 8,099,138 B2 | 1/2012 | Piekarz |
| 8,172,580 B1 | 5/2012 | Chen et al. |
| 8,177,560 B2 | 5/2012 | Rohrbach et al. |
| 8,183,825 B2 | 5/2012 | Sa |
| 8,224,408 B2 | 7/2012 | Tomasini et al. |
| 8,390,255 B1 | 3/2013 | Fathollahi |
| 8,405,974 B2 | 3/2013 | Sayavong |
| 8,414,312 B2 | 4/2013 | Hung et al. |
| 8,435,042 B2 | 5/2013 | Rohrbach et al. |
| 8,453,835 B2 | 6/2013 | So |
| 8,483,758 B2 | 7/2013 | Huang |
| 8,497,753 B2 | 7/2013 | DiFonzo et al. |
| 8,560,014 B2 | 10/2013 | Hu et al. |
| 8,634,887 B2 | 1/2014 | Hu et al. |
| 8,639,288 B1 | 1/2014 | Friedman |
| 8,646,698 B2 | 2/2014 | Chen et al. |
| 8,690,582 B2 | 4/2014 | Rohrbach et al. |
| 8,729,854 B2 | 5/2014 | Tsai et al. |
| 8,760,311 B2 | 6/2014 | Heaton |
| 8,763,802 B2 | 7/2014 | Ellis-Brown |
| 8,801,441 B2 | 8/2014 | Zhang et al. |
| 8,825,123 B2 | 9/2014 | Gudino |
| 8,891,800 B1 | 11/2014 | Shaffer |
| 8,907,783 B2 | 12/2014 | Fish et al. |
| 8,911,246 B2 | 12/2014 | Carnevali |
| 8,929,065 B2 | 1/2015 | Williams |
| 8,950,717 B2 | 2/2015 | Chuang |
| 8,970,332 B2 | 3/2015 | DiFonzo et al. |
| 9,026,187 B2 | 5/2015 | Huang |
| 9,071,060 B2 | 6/2015 | Fathollahi |
| 9,072,172 B2 | 6/2015 | Hsu |
| 9,112,304 B2 | 8/2015 | Rohrbach et al. |
| 9,123,935 B2 | 9/2015 | Huang |
| 9,172,781 B1 | 10/2015 | Goldstein |
| 9,356,267 B1 | 5/2016 | To et al. |
| 9,647,474 B2 | 5/2017 | Fathollahi et al. |
| 2004/0108348 A1 | 6/2004 | Barnes |
| 2005/0189354 A1 | 9/2005 | Heather et al. |

(56) References Cited

U.S. PATENT DOCUMENTS

| | | |
|---|---|---|
| 2006/0058073 A1 | 3/2006 | Kim |
| 2006/0175766 A1 | 8/2006 | Carnevali |
| 2009/0160400 A1 | 6/2009 | Woud |
| 2009/0314400 A1 | 12/2009 | Liu |
| 2012/0018325 A1 | 1/2012 | Kim |
| 2012/0043235 A1 | 2/2012 | Klement |
| 2012/0118773 A1 | 5/2012 | Rayner |
| 2012/0211382 A1 | 8/2012 | Rayner |
| 2012/0250270 A1 | 10/2012 | Liu |
| 2012/0261306 A1 | 10/2012 | Richardson et al. |
| 2012/0298536 A1 | 11/2012 | Rauta et al. |
| 2013/0092576 A1 | 4/2013 | Rayner |
| 2013/0106353 A1 | 5/2013 | Foster |
| 2013/0193006 A1 | 8/2013 | Bergreen et al. |
| 2013/0220841 A1 | 8/2013 | Yang |
| 2013/0258573 A1 | 10/2013 | Muday et al. |
| 2013/0273752 A1 | 10/2013 | Rudisill et al. |
| 2013/0273983 A1 | 10/2013 | Hsu |
| 2013/0331156 A1 | 12/2013 | Lui |
| 2013/0334071 A1 | 12/2013 | Carnevali |
| 2015/0146401 A1 | 5/2015 | Su et al. |
| 2015/0189780 A1 | 7/2015 | Su et al. |
| 2015/0194833 A1* | 7/2015 | Fathollahi ............. H02J 7/0044 320/114 |
| 2016/0315650 A1* | 10/2016 | Cramer ................... F21L 4/00 |
| 2017/0227987 A1* | 8/2017 | Carnevali .......... H01R 13/6205 |
| 2020/0112187 A1* | 4/2020 | Reinger .................. G08B 5/36 |

FOREIGN PATENT DOCUMENTS

| | | |
|---|---|---|
| CN | 204408423 | 6/2015 |
| JP | 2004-349969 | 12/2004 |
| TW | 2003TW531119 | 5/2003 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Officeonthego.com, 3 pages of product description of Magnifico ®Plus screen magnifier product information retrieved from web site at: www.officeonthego.com.

2 pages of product information for Armor 1600 and Armor 1601 waterproof, dustproof and airtight protective cases.

2 pages Otterox 4600 Tablet PC Case protective cases product information retrieved from web site at: www.otterbox.com.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

* cited by examiner

CASES FOR MOBILE DEVICES INCORPORATING A LIGHT WITHIN THE CASE AND METHODS OF MAKING AND USING

FIELD

The present invention is directed to cases for a mobile device. The present invention is also directed to cases for a mobile device that includes a light within the case and methods of making and using the cases.

BACKGROUND

Mobile devices, such as smartphones, cellular or mobile phones, tablets, personal data assistants, and other portable devices, are now ubiquitous. Cases are typically used to protect the mobile device.

BRIEF SUMMARY

One embodiment is a case for a mobile device that includes a cover defining a cavity for receiving and holding the mobile device; an adapter disposed at least partially within the cover; and a light arrangement disposed within or adjacent to the cover. The adapter includes first contacts disposed on an exterior of the case, a male plug extending into the cavity defined by the cover for insertion into a female socket of the mobile device, and second contacts disposed on the male plug and electrically coupled to the first contacts of the adapter. The light arrangement includes a light and a light actuator for manually turning the light on or off. The light is electrically coupled to at least one of the first contacts or the second contacts to obtain power for the light from the mobile device received in the cover and electrically coupled to the second contacts or from an external device electrically coupled to the first contacts.

In at least some embodiments, the light is a light-emitting diode. In at least some embodiments, the light is a white light. In at least some embodiments, the light actuator is a push button. In at least some embodiments, the light actuator is a touch-sensitive actuator. In at least some embodiments, the light actuator is a slide switch or a toggle switch.

In at least some embodiments, the case is configured so that actuation of the light actuator turns the light on or off and the light remains on or off, respectively, until a second operation of the light actuator. In at least some embodiments, the case is configured so that actuation of the light actuator turns the light on, and release of the light actuator turns the light off. In at least some embodiments, the case is configured so that actuation of the light actuator turns the light on and the case is configured to turn the light off after a predetermined amount of time if the light has not been turned off manually. In at least some embodiments, the case further includes a timer coupled to the light and configured to turn the light off after the predetermined amount of time.

In at least some embodiments, the light actuator and light are coupled to the adapter. In at least some embodiments, the light actuator and an emission surface of the light are disposed on opposite sides of the case. In at least some embodiments, the light actuator and the emission surface of the light are disposed opposite each other. In at least some embodiments, the light actuator and an emission surface of the light are disposed on a same side of the case. In at least some embodiments, the adapter further includes conductors electrically coupling the first contacts to the second contacts, where the light is electrically coupled or coupleable to at least two of the conductors.

In at least some embodiments, the cover and the adapter of the case form a male structure that extends from a remainder of the case, wherein the first contacts are disposed on the male structure. In at least some embodiments, the cover of the case is flexible and made from at least one elastomeric polymer. In at least some embodiments, the cover of the case includes a flexible covering and a rigid frame disposed at least partially within the flexible covering.

Another embodiment is an arrangement that includes any of the cases described above and a mobile device receivable within the case and including a female socket to receive the male plug of the adapter of the case.

A further embodiment is an arrangement that includes any of the cases described above and an external device having contacts configured to electrically couple to the first contacts of the case.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to cases for a mobile device. The present invention is also directed to cases for a mobile device that includes a light within the case and methods of making and using the cases.

Figure 1A:
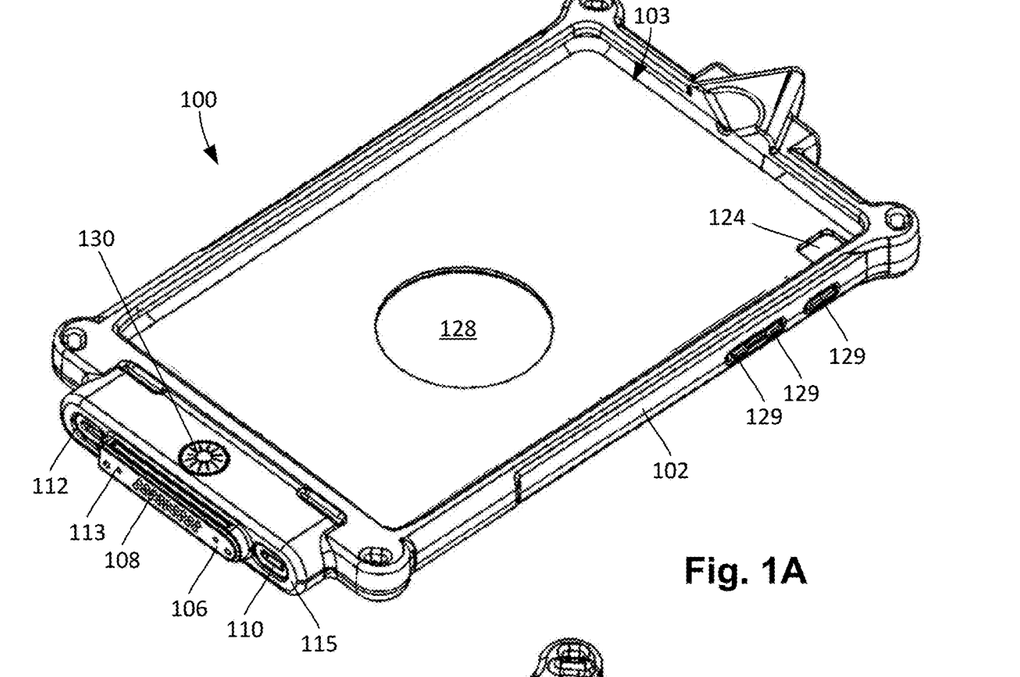
FIG. 1A is a schematic perspective front view of a first embodiment of a case for a mobile device with a light, according to the invention.
Figure 1B:
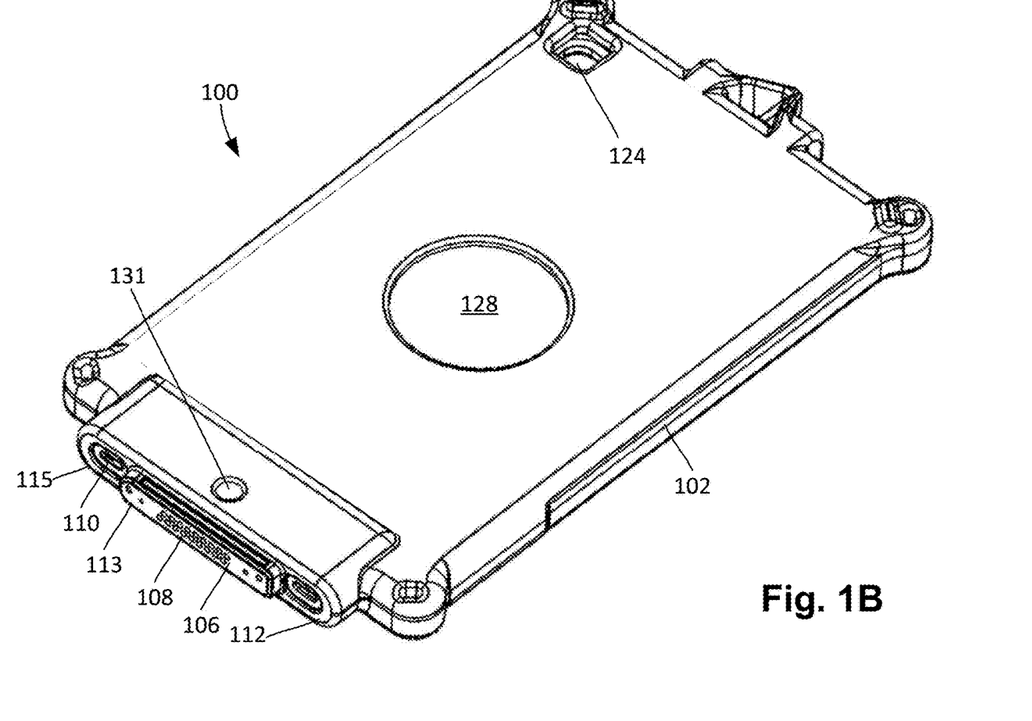
FIG. 1B is a schematic perspective back view of the case of FIG. 1A, according to the invention.

FIGS. 1A and 1B illustrate one embodiment of a case 100 for a mobile device, such as a cellular or mobile phone, a smartphone, a tablet, a personal data assistant, or any other suitable mobile device. The case 100 includes a cover 102 which defines a cavity 103 to receive the mobile device, an adapter 106, a light actuator 130, and a light 131 that activated using the light actuator. The adapter 106 includes first contacts 108 disposed on an exterior of the case 100 for coupling to an external device (not shown), such as a docking cradle, a male plug 109 (FIG. 3A) for insertion into a female socket of the mobile device, and second contacts 142 (FIGS. 4A and 4B) disposed on the male plug so that the adapter can carry power or data or both between the external device and the mobile device. In the illustrated embodiment of FIG. 1, regions 124, 128 are open.

Optionally, the adapter 106 and the cover 102 form a first male structure 112 extending away from the cavity 103. Optionally, the first male structure 112 also includes a second male structure 113 extending out of a base 115 of the first male structure 112. In at least some embodiments, the first male structure 112 or second male structure 113 (or both) are configured for coupling to a female connector (not shown) or any other suitable connector of the external device. The adapter optionally includes a female connector 110, such as a USB-A, USB-B, USB-C, Micro-USB, Mini-USB, or Lightning connector or the like.

The cover 102 can be made of any suitable material including any suitable polymeric material. The cover 102 can be made of a flexible material (for example, thermoplastic elastomeric polymer materials, other suitable flexible or elastomeric polymer materials, or the like or any combination thereof) or rigid material or any combination thereof. For example, flexible covers that can be modified to include a light 131 and light actuator 131 are described in U.S. Pat. Nos. 9,195,279; 9,331,444; 9,529,387; 9,602,639; 9,632,535; 9,706,026; 10,050,658; 10,054,984; 10,389,399; 10,454,515; and 10,630,334, all of which are incorporated herein by reference in their entireties.

Figure 2A:
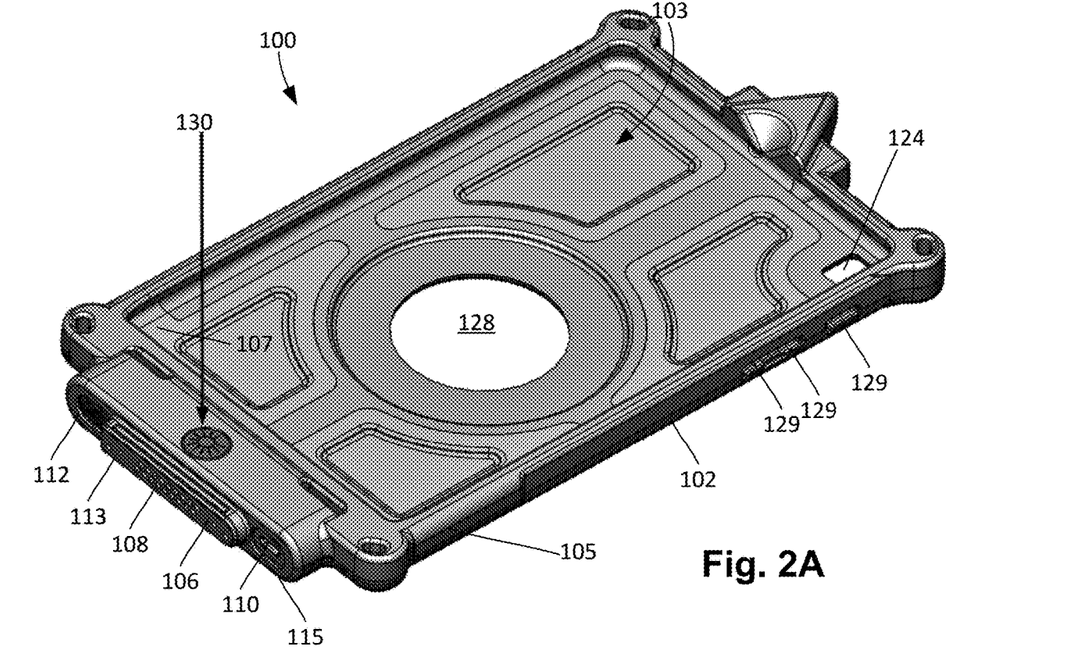
FIG. 2A is a schematic perspective front view of a second embodiment of a case for a mobile device with a light, according to the invention.
Figure 2B:
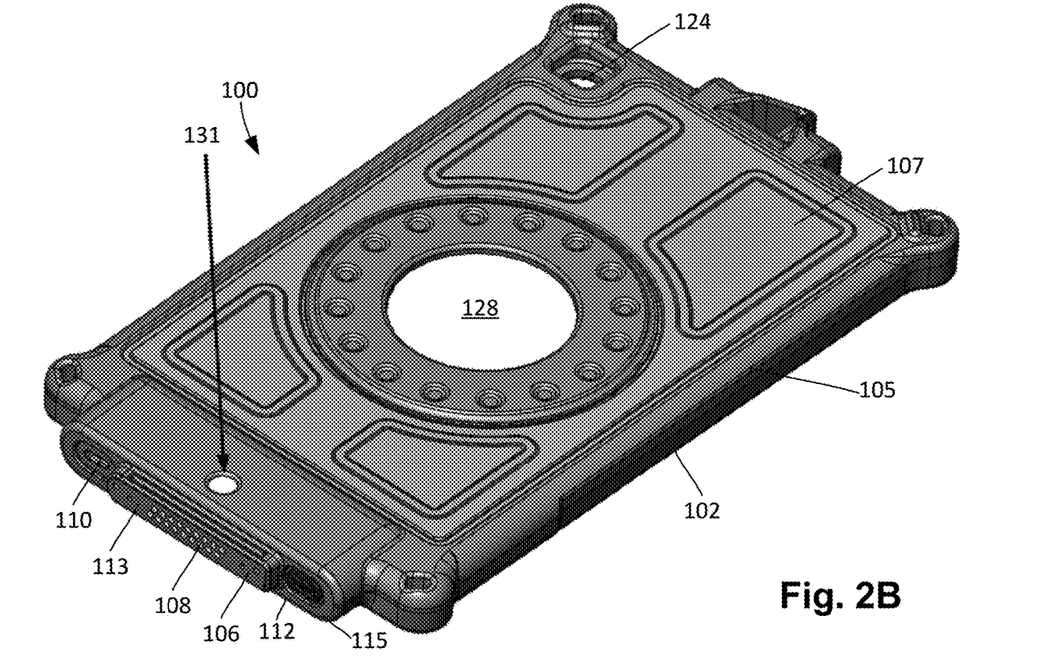
FIG. 2B is a schematic perspective back view of the case of FIG. 2A, according to the invention.

FIGS. 2A and 2B illustrate a case 100 with a cover 102 that includes a flexible covering 105 and a rigid frame 107 disposed at least partially within the flexible covering. The adapter 106 is disposed at least partially within the flexible covering and the rigid frame. The terms "flexible" and "rigid", when used in the context of "flexible covering" and "rigid frame", are intended to be relative to each other, such that the flexible covering feels more flexible, as judged by an average adult user, than the rigid frame and the rigid frame is more rigid, as judged by the average adult user, than the flexible cover. Further details regarding such cases can be found in U.S. patent application Ser. No. 16/853,544 (entitled "Cases for Mobile Devices with a Flexible Covering and Rigid Frame or with two different Connector Arrangements and Methods of Making and Using" and filed on even date herewith), which is incorporated herein by reference in its entirety. In the illustrated embodiment of FIGS. 2A and 2B, regions 124, 128 are open.

When the mobile device is received in the case 100, the cover 102 is arranged to cover at least a portion of all the side surfaces of the mobile device and to extend over at least a portion (or all) of the peripheral edges of the front and back surfaces of the mobile device to hold the mobile device in the case and to provide protection to the mobile device. Optionally, the cover 102 can include one or more soft buttons 129 that are positioned in the flexible covering to coincide with positions (or possible positions) of buttons on the mobile device. The soft buttons 129 are arranged so that depression of the soft buttons with sufficient force results in depression of the buttons of a mobile device received in the case 100. The cover 102 can also include one or more openings 124 to provide access to a speaker, a microphone, a camera, a light, a jack, or the like on the mobile device.

A mobile device in the case 100 can be electrically coupled to an external device, such as a docking cradle, connector, adapter, or the like, through the first contacts 108. Non-limiting examples of external devices, such as docking cradles, connectors, or adapters or the like, are described in U.S. Pat. Nos. 9,195,279; 9,331,444; 9,529,387; 9,602,639; 9,632,535; 9,706,026; 10,050,658; 10,054,984; 10,389,399; 10,454,515; and 10,630,334; U.S. patent application Ser. No. 16/853,544 (entitled "Cases for Mobile Devices with a Flexible Covering and Rigid Frame or with two different Connector Arrangements and Methods of Making and Using" and filed on even date herewith); and U.S. patent application Ser. No. 16/853,565 (entitled "Cradles and Cases for Mobile Devices incorporating Guide Elements or Modular Components and Methods of Making and Using" and filed on even date herewith), all of which are incorporated herein by reference in their entireties.

Many smartphones and other mobile devices include a light for use with a camera of the mobile device. Many users also utilize the light as a flashlight operated by an application or function of the mobile device. Other mobile devices, such as many tablets, do not include a light even when the mobile device has a camera. Users find the light on mobile devices desirable.

Accordingly, the case 100 includes a light 131 that is operated using the light actuator 130. The light 131 may operate using power from the mobile device disposed in the case 100 (or from a supplemental battery stored in the case or otherwise attached to the mobile device). In at least some embodiments, the light 131 may also, or alternatively, operate using power from an external device, such as a docking cradle or device charger, electrically coupled to the case 100.

The case 100 can be used with a mobile device that does not include a light. The case can even be used with a mobile device that includes a light to provide a second or alternative light source. For example, a user may desire a light 131 that does not require executing an application or function on the mobile device to activate, but is instead activated by actuation of the light actuator 130 or the user 131 may desire additional light from a second light source for brightness or to reduce shadows or the like.

The light actuator 130 can be any suitable element, device, or arrangement that can be used to operate the light 131 including, but not limited to, a push-button, a touch-activated switch, a slide switch, a toggle switch, any other suitable switch, or the like or any combination thereof. Additionally or alternatively, the light actuator 130 may include a software, hardware, or combination of software and hardware arrangement that allows the light 131 to be turned on (and, optionally, turned off) using an application or function on the mobile device.

The light 131 can be any suitable light source including, but not limited to, a light-emitting diode (LED), a laser diode, or the like or any combination thereof. The light 131 can be selected to provide emissions at any suitable wavelength or range of wavelengths in the visible spectrum (and might include emissions in the infrared or ultraviolet spectral regions). The light 131 can be a white light or light of any other suitable color or may change color periodically, randomly, or manually. In at least some embodiments, the light 131 can be, or can be changed to, a red light for night vision. In at least some embodiments, the light 131 is a white light with reduced blue component (or passed through a blue filter) to reduce eye strain. The light 131 is illustrated as a single light source in FIGS. 1A and 1B but, in other embodiments, the light 131 can be multiple light sources which may be disposed adjacent to each other or spaced apart (for example, at different positions along the cover) from each other in any suitable arrangement.

In at least some embodiments, the light actuator 130 and light 131 can be centered along one side of the case 100 or centered (laterally or longitudinally or both) on the adapter 106 or male structure 112. In other embodiments, the light actuator 130 and light 131 can be disposed off-center along one side of the case or off-center (laterally or longitudinally or both) relative to the adapter 106 or male structure 112. In at least some embodiments, the light actuator 130 is disposed directly opposite the emission surface 133 of the light 131 on opposite sides of the case 100, as illustrated in FIGS. 1A and 1B. In other embodiments, the light actuator 130 and the emission surface 133 of the light 131 may be disposed on opposite sides of the case 100, but not directly aligned with each other. In still other embodiments, the light actuator 130 and the emission surface 133 of the light 131 can be disposed on the same side of the case 100 and can be adjacent to each other or spaced apart from each other.

Figure 3A:
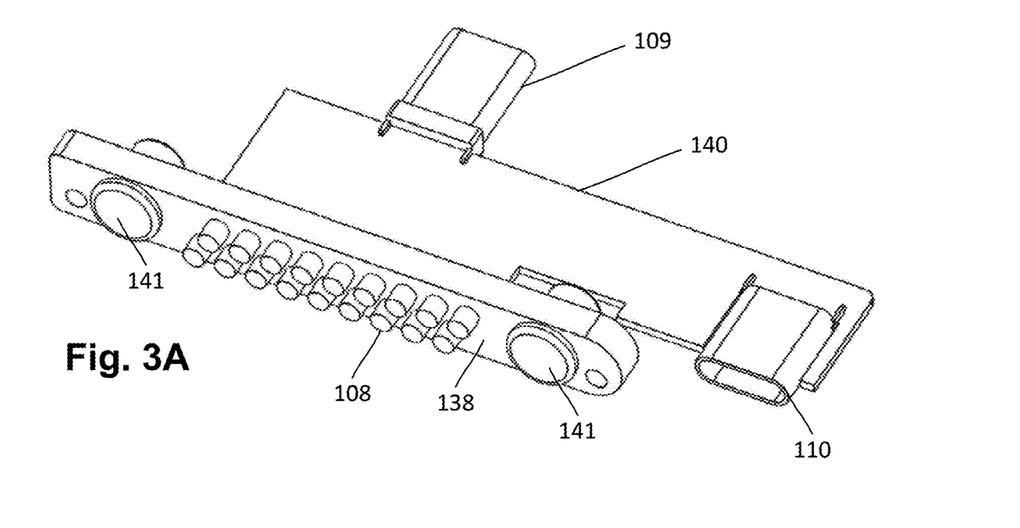
FIG. 3A is a schematic perspective view of one embodiment of an adapter of a case for a mobile device, according to the invention.
Figure 3B:
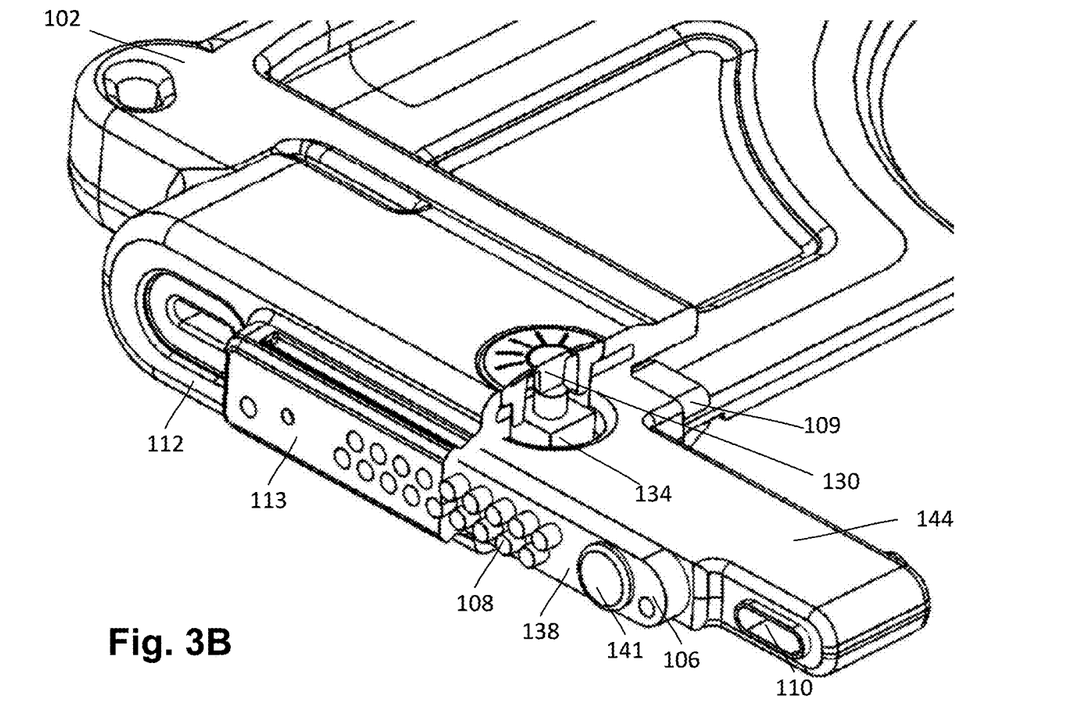
FIG. 3B is a schematic perspective front view of a portion of the case of FIG. 2A partially cutaway to illustrate internal components of the case, according to the invention.
Figure 3C:
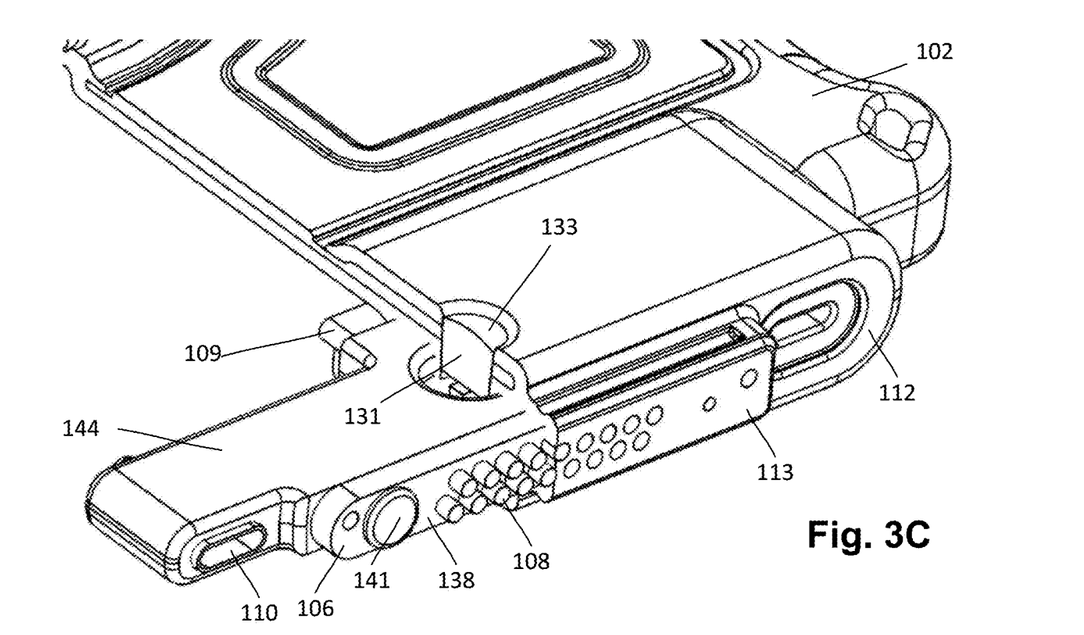
FIG. 3C is a schematic perspective back view of a portion of the case of FIG. 2A partially cutaway to illustrate internal components of the case, according to the invention.

FIG. 3A illustrates a portion of the adapter 106 which includes the male plug 109 for coupling to a female connector of the mobile device, the first contacts 108 for coupling to contacts of an external device, a contact support 138, the female connector 110, a substrate 140 (such as a printed circuit board) for carrying conductors (not shown—for example, conductive traces or wires) that couple the first contacts 108 and the female connector 110 to the male plug 109, and one or more optional magnetic elements 141. The optional magnetic elements 141 can be made of either magnetic material or magnetically attracted material (for example, a ferromagnetic material). In at least some embodiments, the external device can include magnetic elements that magnetically interact with the magnetic elements 141 of the adapter 106, as described in more detail in U.S. Pat. Nos. 9,195,279; 9,331,444; 9,529,387; 9,602,639; 9,632,535; 9,706,026; 10,050,658; 10,054,984; 10,389,399; 10,454,515; and 10,630,334, all of which are incorporated herein by reference in their entireties. FIGS. 3B and 3C illustrate an overmold 144 disposed over the substrate 140, female connector 110, and a portion of the male plug 109.

FIGS. 3A to 3C illustrate one arrangement of the first contacts 108 of the cover 100. In this arrangement, there are eighteen first contacts 108 arranged in two rows. In the illustrated embodiment, the rows are staggered, but it will be recognized that the rows can be aligned with each other, instead of staggered. The external device can have the same number and arrangement of electrical contacts although in some embodiments, the external device may have fewer or more contacts than the cover 100. It will be understood that the cover 100 can include any number of first contacts 108 including, but not limited to, two, three, four, five, six, seven, eight, nine, ten, twelve, fourteen, sixteen, eighteen, twenty, or more first contracts. The first contacts 108 can be arranged in any regular or irregular pattern. For example, three first contacts can be arranged in a straight line, an equilateral triangle, an isosceles triangle, a right triangle, or any other suitable arrangement. As another example, some or all of the first contacts 108 can be arranged at vertices of a regular or irregular polygon, such as a pentagon, hexagon, or octagon.

FIGS. 3B and 3C illustrate top and bottom partial cutaway views of the adapter 106 in the cover 102 and further illustrate the light actuator 130 (FIG. 3B) and light 131 (FIG. 3C). In some embodiments, actuating (e.g., pushing) the light actuator 130 will turn the light 131 on or off (depending on the current state of the light) and the light will continue to be on or off, respectively, until the light actuator is actuated again. In other embodiments, actuating the light actuator 130 turns the light 131 on and releasing the light actuator turns the light off. For example, the light actuator 130 can simply include one or more contacts that permit the flow of power through the light 131 when the light actuator 130 is actuated. The light arrangement can also include an optional timer 134 for turning the light 131 off after actuation of the light actuator 130. In at least some embodiments, the light actuator 130, light 131, or timer 134 may be configured to turn off the light after a predetermined amount of time (for example, 30 seconds or 1, 2, 3, 4, or 5 minutes) after the light has been turned on, for example, to conserve power. For example, the light actuator 130, light 131, or optional timer 134 may be set (or can be set) to turn off the light after the predetermined amount of time.

In at least some embodiments, actuating the light actuator 130 initiates a mode in the mobile device 470 (FIG. 4A) that supplies power to an external device; in this case, the light 131. For example, actuating the light actuator can initiate an OTG (On-The-Go) mode in the mobile device 470 to provide power to, and turn on, the light 131. In at least some embodiments, this actuation of the light actuator 130 is a user operating a light actuator on the case 100. Alternatively or additionally, in at least some embodiments, the light actuator may be actuated using an application or function of the mobile device 470 which communicates with the light actuator on or in the case 100.

In at least some embodiments, the actuating of the light actuator 130 (or providing power to the light 131) starts a timer (which may be a timing circuit or an integrated circuit with timing functionality or the like or any combination thereof). Upon expiration of the timer, the power to the light 131 is terminated. In at least some embodiments, each actuation of the light actuator 130 starts the timer at a full timer amount of time. In other embodiments, the timer may include a memory and may only be reset after expiration of the full timer amount of time. In at least some embodiments, the full timer amount of time may not be adjustable by the user but is set by the components of the case 100. In other embodiments, the full timer amount may be user-adjustable using the mobile device 470 or other programming arrangement.

Figure 4A:
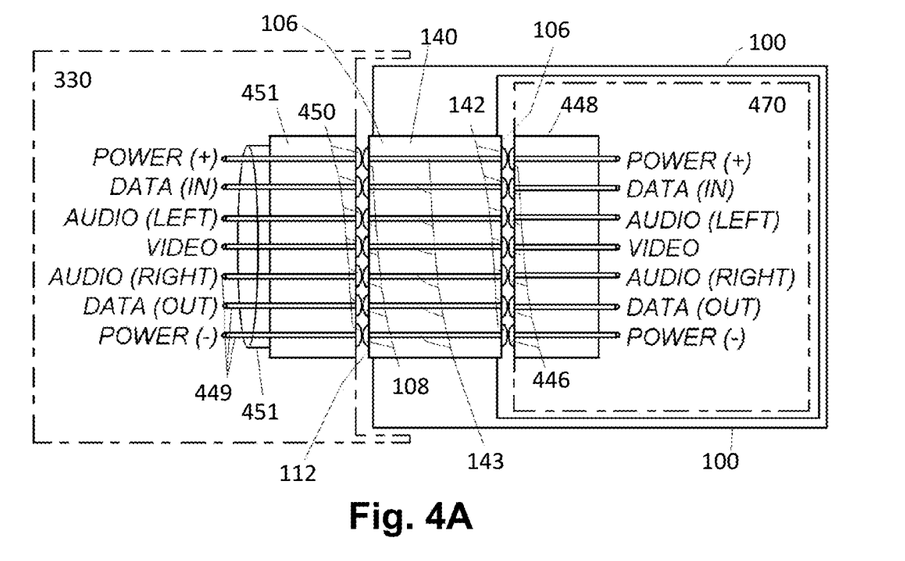
FIG. 4A is a block diagram of a first embodiment of electrical connection between a docking cradle, an adapter of the case of FIG. 1A, and a mobile device when the mobile device is received in the case and the docking cradle is electrically coupled to the adapter of the case, according to the invention.

FIG. 4A is a block diagram of one embodiment of electrical connection between an external device 330, the adapter 106 of the case, and a mobile device 470 when the mobile device is received in the case and the external device is electrically coupled to the adapter of the case. In this embodiment, the first contacts 108 of the adapter are coupled to the second contacts 142 on the male plug 109 through conductors 143 that are sequentially ordered. As illustrated, contacts 446 in a female socket 448 of the mobile device 470 are electrically coupled to the second contacts 142 on the male plug 109 of the adapter and contacts 450 (which are, optionally, in a female connector 451 or other connector) of the external device 330 are coupled to the first contacts 108 of the adapter 106. FIG. 4A illustrates one example of an arrangement 449 of these contacts as assigned to particular inputs/outputs. It will be recognized that other assignments of inputs/outputs or arrangements of assignments of inputs/outputs can be used.

Figure 4B:
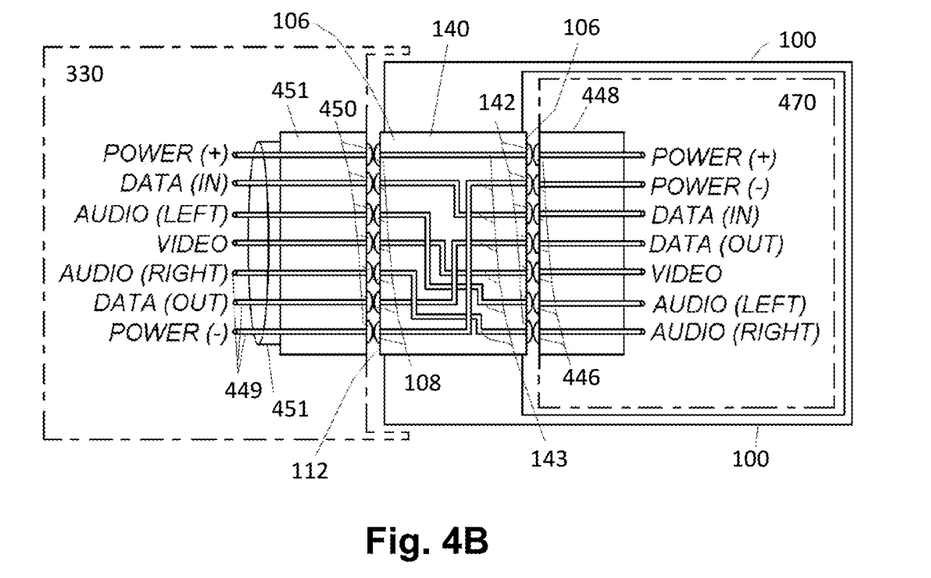
FIG. 4B is a block diagram of a second embodiment of electrical connection between a docking cradle, an adapter of the case of FIG. 1A, and a mobile device when the mobile device is received in the case and the docking cradle device is electrically coupled to the adapter of the case, according to the invention.

FIG. 4B is a block diagram of another embodiment of electrical connection between the external device 330, adapter 106, and mobile device 440. In this embodiment, the first contacts 108 are coupled to the second contacts 142 in a non-sequential relationship with at least some of the conductors 143 overlapping (with intervening insulation). Accordingly, the adapter 106 can be used to couple a specific type of mobile device to a universal external device by rearranging the inputs/outputs from the mobile device to the arrangement of inputs/outputs of the universal external device, such as a docking device or docking cradle. This allows the universal external device to be used with a variety of mobile devices by selection of the appropriate adapter to convert the arrangement of inputs/outputs from the mobile device to the universal external device.

Although FIGS. 4A and 4B illustrate the coupling of the first contacts 108 to the second contacts 142, it will be recognized that a similar arrangement of conductors 143 can be used to couple the contacts 162 of the optional female connector 110 to the second contacts 142 of the male plug 109 of the adapter 106, as illustrated in FIGS. 4A and 4B (using the reference "108/162"). In some embodiments, the female connector 110 is identical to the female socket 448 of the mobile device 440. For example, if the female socket of the mobile device is a USB C type socket, then the female connector is also USB C. In other embodiments, the female connector 110 is a different type or connector, or has a different input/output arrangement, from the female socket 448 of the mobile device 440.

Figure 4C:
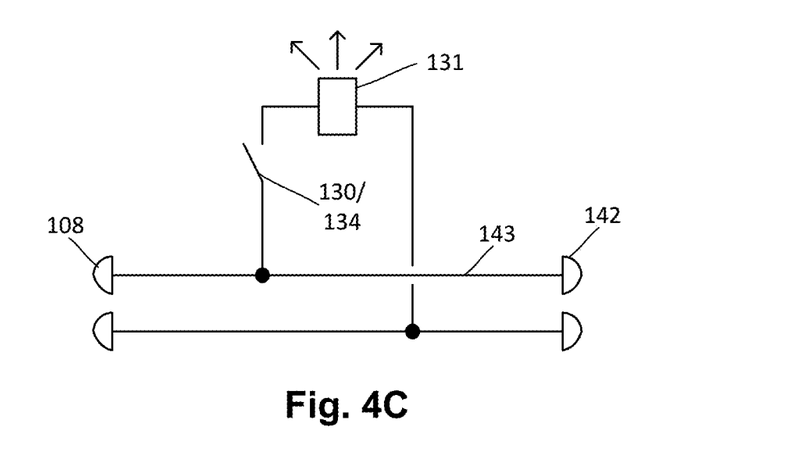
FIG. 4C is a schematic diagram of one embodiment of a coupling of the light to conductors in the adapter of a case for a mobile device, according to the invention.

FIG. 4C illustrates one embodiment of the coupling of the light 131 and light actuator 130 (or other switch) to two of the conductors 143 that extend between those first contacts 108 and second contacts 142 that are intended to carry power. Other coupling arrangements can be used. This arrangement can be used to provide power to the light 131.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A case for a mobile device, the case comprising
   a cover defining a cavity configured for receiving and holding the mobile device;
   an adapter disposed at least partially within the cover, the adapter comprising a plurality of first contacts disposed on an exterior of the case, a male plug extending into the cavity defined by the cover and configured for insertion into a female socket of the mobile device, and a plurality of second contacts disposed on the male plug and electrically coupled to the first contacts of the adapter; and
   a light arrangement disposed within or adjacent to the cover, the light arrangement comprising a light and a light actuator configured for manually turning the light on or off, wherein the light is electrically coupled to at least one of the first contacts or the second contacts to obtain power for the light from the mobile device received in the cover and electrically coupled to the second contacts or from an external device electrically coupled to the first contacts.

2. The case of claim 1, wherein the light is a light-emitting diode.

3. The case of claim 1, wherein the light is a white light or a red light.

4. The case of claim 1, wherein the light actuator is a push button.

5. The case of claim 1, wherein the light actuator is a touch-sensitive actuator.

6. The case of claim 1, wherein the light actuator is a slide switch or a toggle switch.

7. The case of claim 1, wherein the case is configured so that actuation of the light actuator turns the light on or off and the light remains on or off, respectively, until a second operation of the light actuator.

8. The case of claim 1, wherein the case is configured so that actuation of the light actuator turns the light on, and release of the light actuator turns the light off.

9. The case of claim 1, wherein the case is configured so that actuation of the light actuator turns the light on and the case is configured to turn the light off after a predetermined amount of time if the light has not been turned off manually.

10. The case of claim 9, further comprising a timer coupled to the light and configured to turn the light off after the predetermined amount of time.

11. The case of claim 1, wherein the light actuator and light are coupled to the adapter.

12. The case of claim 1, wherein the light actuator and an emission surface of the light are disposed on opposite sides of the case.

13. The case of claim 12, wherein the light actuator and the emission surface of the light are disposed opposite each other.

14. The case of claim 1, wherein the light actuator and an emission surface of the light are disposed on a same side of the case.

15. The case of claim 1, wherein the adapter further comprises conductors electrically coupling the first contacts to the second contacts, wherein the light is electrically coupled or coupleable to at least two of the conductors.

16. The case of claim 1, wherein the cover and the adapter of the case form a male structure that extends from a remainder of the case, wherein the first contacts are disposed on the male structure.

17. The case of claim 1, wherein the cover of the case is flexible and made from at least one elastomeric polymer.

18. The case of claim 1, wherein the cover of the case comprises a flexible covering and a rigid frame disposed at least partially within the flexible covering.

19. An arrangement, comprising:
   the case of claim 1; and
   the mobile device receivable within the case and comprising the female socket configured to receive the male plug of the adapter of the case.

20. An arrangement, comprising:
   the case of claim 1; and
   the external device comprising contacts configured to electrically couple to the first contacts of the case.

* * * * *